Jan. 22, 1963   H. G. ANDRÉ   3,075,032
ELECTRODE ASSEMBLY FOR ELECTRIC BATTERIES OR ACCUMULATORS
Filed Nov. 19, 1959   4 Sheets-Sheet 1
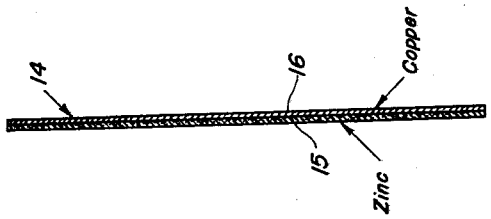
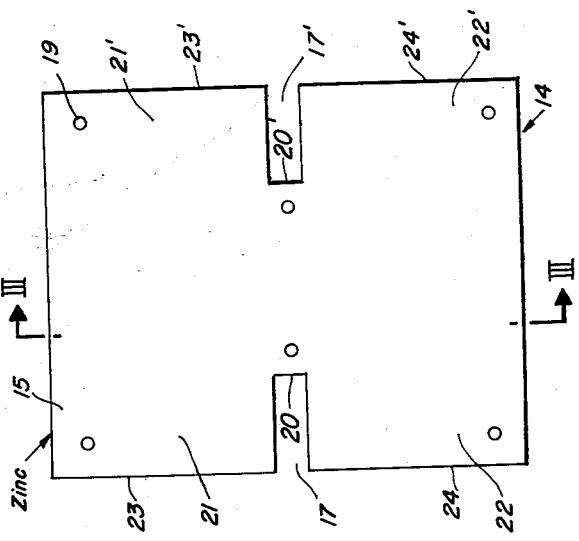
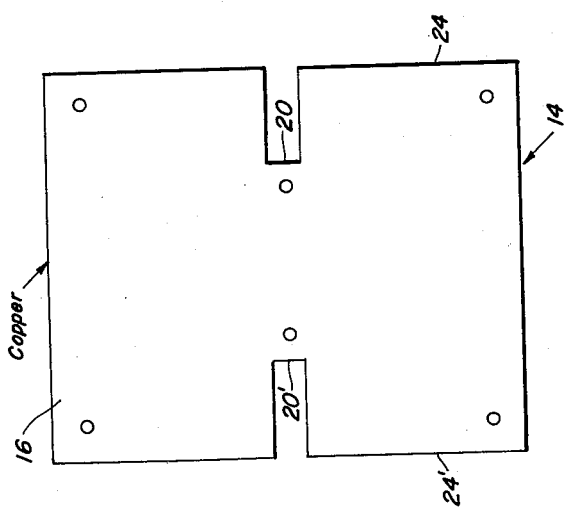
INVENTOR:
HENRI GEORGES ANDRÉ
BY
AGENT

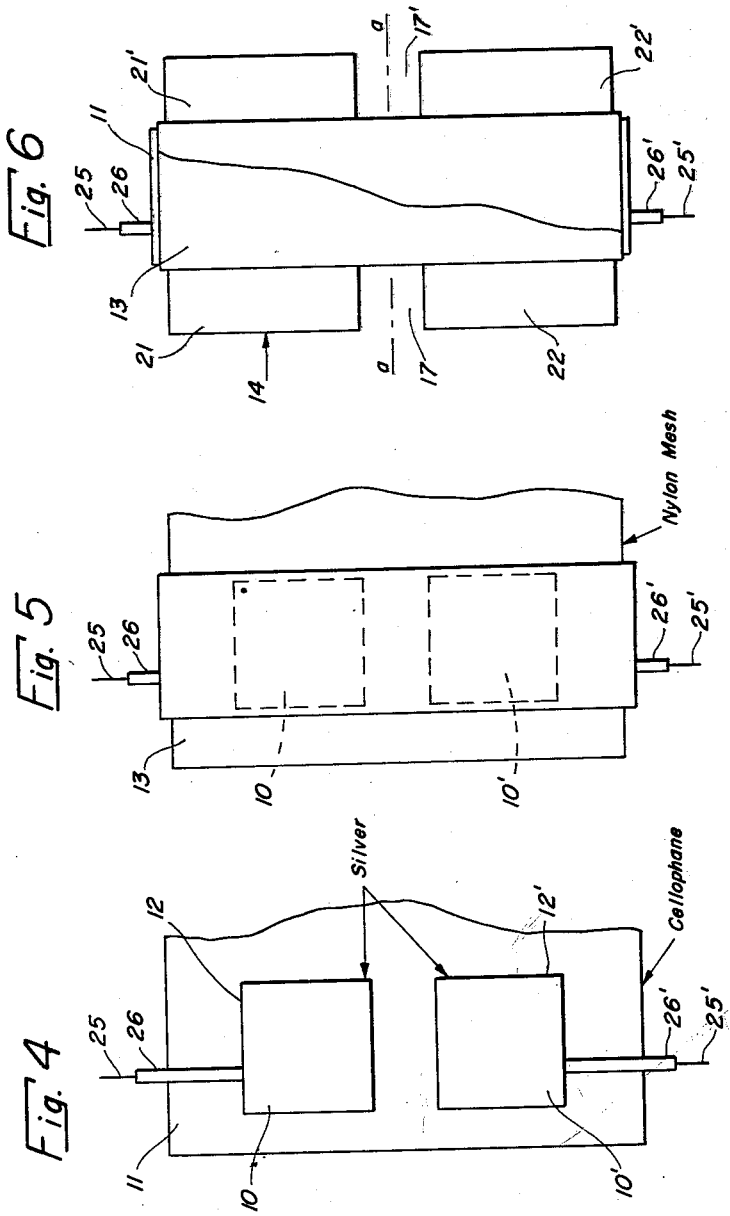

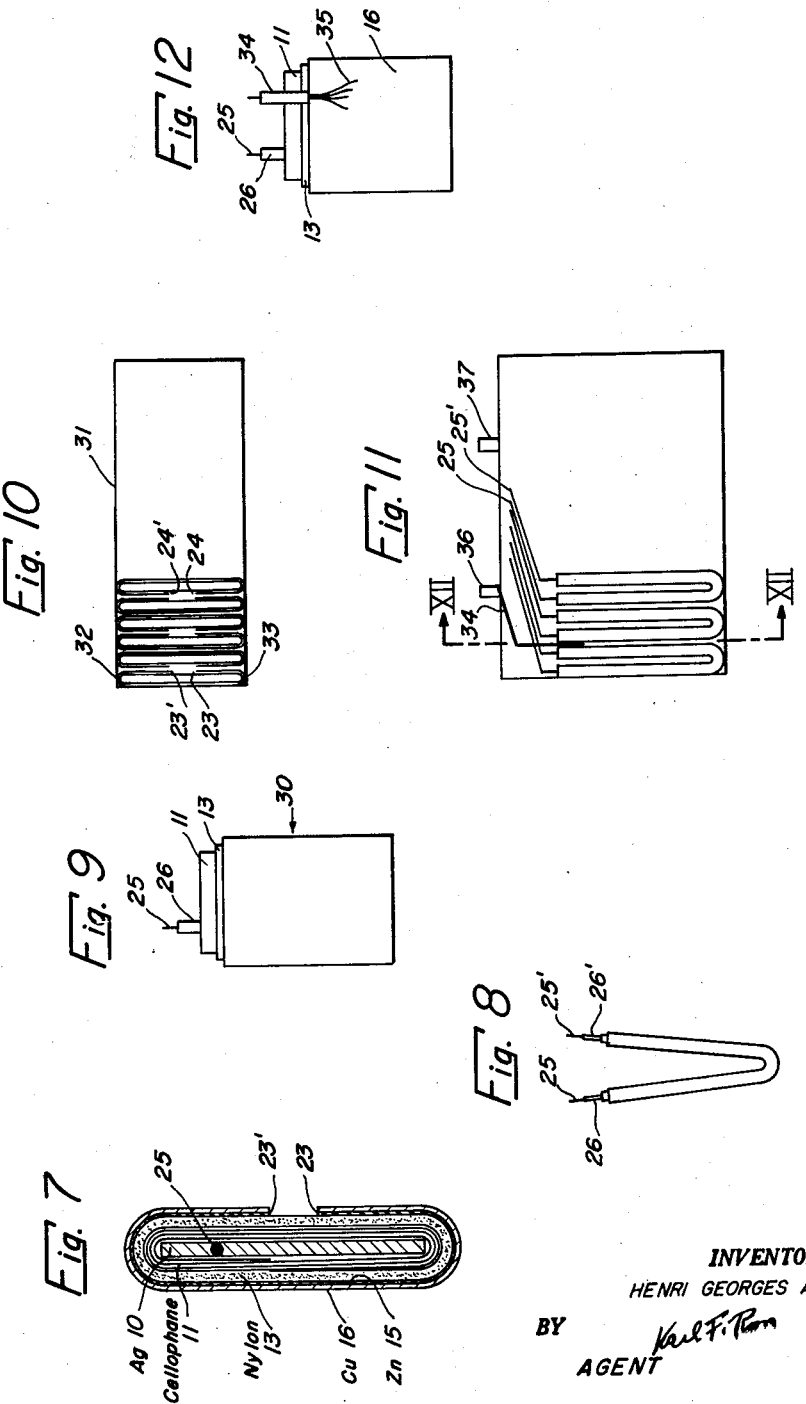

Jan. 22, 1963   H. G. ANDRÉ   3,075,032
ELECTRODE ASSEMBLY FOR ELECTRIC BATTERIES OR ACCUMULATORS
Filed Nov. 19, 1959   4 Sheets-Sheet 4
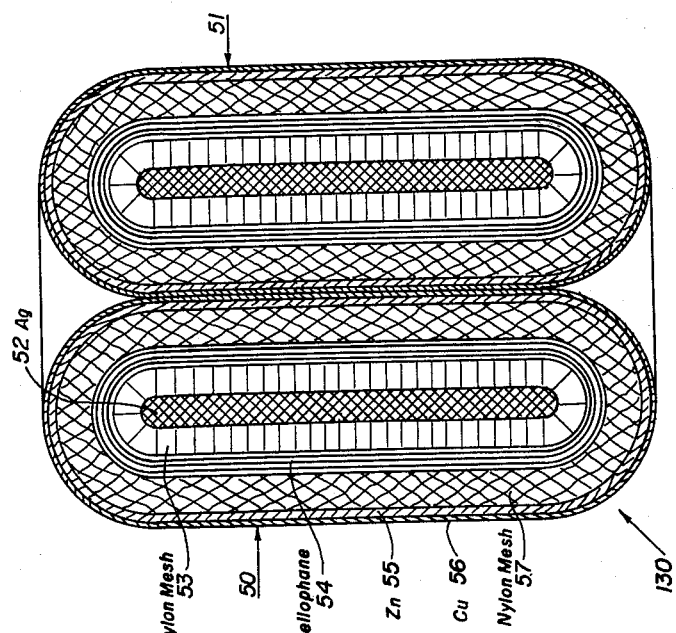
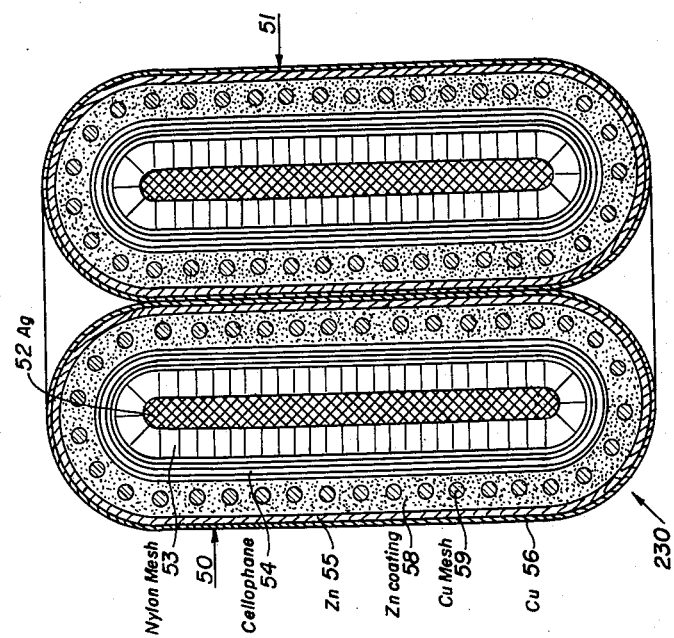
INVENTOR:
HENRI GEORGES ANDRÉ
BY
AGENT United States Patent Office 3,075,032
Patented Jan. 22, 1963

3,075,032
ELECTRODE ASSEMBLY FOR ELECTRIC
BATTERIES OR ACCUMULATORS
Henri Georges André, Montmorency, France, assignor to Yardney International Corp., New York, N.Y., a corporation of New York
Filed Nov. 19, 1959, Ser. No. 854,129
Claims priority, application France Nov. 26, 1958
8 Claims. (Cl. 136—6)

The present invention relates to an electrode assembly for electric batteries or accumulators in which the negative electrode or electrodes contain zinc as an active material, e.g. as is the case in alkaline silver-zinc batteries.

In batteries of this description, especially rechargeable ones, the performance of the negative electrode or electrodes poses considerable problems. One reason is that zinc, when converted to its oxide and/or hydroxide in the discharge of the battery, becomes poorly conductive so that grids or other separate conductive elements are required to insure proper current distribution. Another drawback is the poor cohesion of the active material of such electrodes which, accordingly, tends to gravitate toward the bottom of the battery or cell casing, the electrode thus undergoing objectionable changes in shape which further reduces its overall conductivity and interferes physically as well as electrochemically with the proper operation of the battery. Finally, the particles of negative active material tend to migrate toward the positive electrode or electrodes and must be restrained through the use of suitable separators and/or other retentive agents.

It is already known that certain inert material, notably copper, have an affinity for zinc which can be utilized to minimize the migration of zinc particles by causing their reprecipitation on a support of this type during each charging cycle. The invention has for its object the creation of an improved electrode assembly in which the restraining action of a relatively inert, preferably highly conductive material such as copper upon the zinc of a negative electrode is utilized more effectively than heretofore.

In Patent No. 550,145 there has been disclosed an electrode assembly in which a negative electrode in the form of a zinc sheet embraces an envelope of separator material containing one or more positive electrodes. It has now been found, in accordance with the present invention, that the performance of the negative electrode is greatly improved if the simple zinc sheet is replaced by a composite sheet including an inner layer of zinc and an outer layer of a retentive, highly conductive material such as silver or, preferably, copper. The two layers may be laminated together in a variety of ways, e.g. by electroplating, hot-spraying, sputtering or otherwise depositing one material upon the other, by bonding the two layers together with simultaneous application of heat and pressure, or by spot-welding.

If the zinc is deposited upon its protective support by sintering, plating, spraying or similar processes leading to the formation of a spongy layer, the initial capacity of the electrode assembly will be high; this is particularly important in the case of so-called dry-charged batteries. If, on the other hand, the zinc layer is initially in the form of a solid sheet, the invention proposes subjecting the electrode assembly to an initial overcharging step in which substantially all of the available positive material is converted to its highest state of oxidation, i.e. practically all of the silver is oxidized to silver peroxide in the case of a zinc-silver battery, as compared with a normal charge which is terminated when only a minor fraction of the silver, e.g. up to one third, is so oxidized. It has been established that such an initial overcharge will subject the negative electrode to a process of formation resulting in a sustained increase of the capacity of the accumulator; thus, where an initial capacity of 7 ampere-hours drops to 5.8 ampere-hours after 20 cycles of operation, the preliminary overcharge results in a capacity whose value at the start is 8 ampere-hours and is still as high as 7 ampere-hours after 100 cycles. This favorable result can be realized by impressing upon the electrode assembly an initial charge of approximately 150% of its rated capacity (assuming an excess of zinc over the equivalent silver mass), preferably at a relatively slow rate such as that corresponding to a completion of the charge in approximately 40 hours, starting with positive electrodes consisting entirely of metallic silver. The improvement realized in this manner, which is not limited to batteries or accumulators with copper-coated zinc electrodes, is most marked if the positive electrodes are of greatly reduced thickness, preferably of the order of half a millimeter or less; excellent results have been obtained with silver plates of 0.3 mm. thickness.

A copper layer having a thickness of a few hundredths of a millimeter is eminently suitable as the protective agent; the zinc layer may be of somewhat greater thickness, e.g. as determined by the usual requirement that the amount of zinc exceed the equivalent amount of silver.

It should be noted at this point that the aforedescribed overcharge will be without beneficial effect if carried out at a time subsequent to the first charging cycle of the battery. This surprising result may be explained by the fact that the alkaline electrolyte undergoes an appreciable modification during cycling, changing in the usual cases from an aqueous solution of potassium hydroxide to a liquid having an appreciable proportion of potassium zincate dissolved therein.

It is desirable that a porous layer, adapted to store a sufficient amount of electrolyte, be interposed between the semi-permeable wrapping around the positive electrode or electrodes and the composite sheet constituting the negative electrode of this invention. Such a porous layer may take the form of a nylon mesh, preferably one consisting of nylon filaments which have been rendered more highly wettable by prolonged immersion in a hot alkaline solution. Advantageously, a layer of this description is also inserted into the semi-permeable envelope between the latter and the positive plates. In lieu of a non-metallic layer, however, it is sometimes advantageous to use on the negative side a porous metallic layer of basically the same composition as the negative electrode proper, i.e. one having a highly conductive, relatively inert framework such as a mesh of copper filaments bearing a spongy deposit of zinc which may have been produced, for example, by vaporization. It has been found, surprisingly enough, that the presence of copper between the electrodes of opposite polarities inhibits parasitic reactions and, as it were, increases the effective surface area of the electrodes so that increased currents can be passed on both charge and discharge; whereas a normal charging time for a typical accumulator without copper inserts might range from 30 to 40 hours, this time can be cut to less than 20 hours through the use of such internal copper support and may even go as low as 8 to 10 hours.

Where a plurality of electrode assemblies of the character described are inserted side by side into a battery casing so as to be subjected to pressure by the swelling of the separator material in the electrolyte, as is well known per se, the direct contact provided between the outer conductive layers of the negative electrodes will obviate the need for individual terminal connections from these electrodes so that only a single such connection need be provided. Naturally, the composite sheets should be so arranged as to leave a vent for the escape of evolving gases, this being conveniently accomplished by so foreshortening the sheets that their edges will remain spaced apart as they embrace the envelopes of separator material wrapped around the positive electrodes.

The invention will be described in greater detail with reference to certain embodiments shown in the accompanying drawing in which:

FIGS. 1 and 2 are face views of a blank adapted to form a negative electrode embodying the invention, seen from opposite sides;

FIG. 3 is a cross-sectional view taken on the line III—III of FIG. 2;

FIGS. 4, 5 and 6 show successive steps in the formation of an electrode assembly according to the invention, incorporating the blank of FIGS. 1–3;

FIG. 7 is a cross-sectional view of the nearly completed electrode assembly;

FIGS. 8 and 9 are a side and a front elevation, respectively, of the completed electrode assembly drawn to a smaller scale;

FIG. 10 is a top plan view of an entire battery incorporating a plurality of electrode assemblies as shown in FIGS. 8 and 9;

FIG. 11 shows the battery of FIG. 10 in sectional elevation;

FIG. 12 is a sectional elevation taken on the line XII—XII of FIG. 11;

FIG. 13 is an enlarged sectional top view of an electrode assembly similar to that shown in FIGS. 8 and 9; and FIG. 14 is a view similar to FIG. 13, showing a modified electrode assembly according to the invention.

In FIGS. 1–3 there is shown a composite blank 14, of generally rectangular configuration, consisting of two co-extensive metal sheets 15 and 16 laminated together, sheet 15 consisting of zinc and sheet 16 of copper. Although the two sheets could have been bonded to each other by any of the several processes referred to above, they are here shown to be joined together by spot-welding at various locations 19. The sheets are divided into four quadrants 21, 21' and 22, 22' by two narrow, opposite cuts 17, 17' which give to the blank the shape of an H with rather heavy legs and cross bar.

As shown in FIGS. 4–6, two positive electrodes 10, 10' in the form of thin silver plates, provided with terminal leads 25, 25' in protective tubes 26, 26', respectively, are wrapped in one or more turns of a sheet 11 of semi-permeable separator material such as cellophane (regenerated cellulose). The unit 10, 11 thus produced is then wrapped in a porous layer 13, e.g. of nylon mesh, whose length is slightly less than that of the semi-permeable envelope 11 while still exceeding the distance between the remote edges 12, 12' of plates 10, 10'. Next, the positive electrodes in their composite wrapper 11, 13 are placed on the blank 14 so that its cuts 17, 17' are aligned with the spacing between the plates 10 and 10'. The legs 21, 21' and 22, 22' of the H formed by this blank are then folded around the outer wrapper 13, the relative dimensioning of the parts being such that the opposite edges 23, 23' and 24, 24' of the blank do not quite contact each other as best seen in FIG. 7. Thereupon the entire assembly is folded about the median line a—a (FIG. 6), which bisects the cuts 17 and 17', to form a U-shaped unit 30 as illustrated in FIGS. 8 and 9. A plurality of such units are introduced into a battery casing 31 whose side walls 32, 33 narrowly confine these units and whose length is so chosen that, upon the introduction of an alkaline electrolyte into the casing, the electrodes will be placed in compression by the swelling of the separator material 11.

A lead 34, extending to the negative terminal 36, has several strands 35 soldered or otherwise secured to the copper surface 16 of one of the electrode assemblies, as best seen in FIG. 12. The leads 25, 25' from the positive plates are joined to the other terminal 37 as is well known per se.

As best seen in FIG. 10, the gaps existing between the edges 23, 23' and 24, 24' of each unit 30 form a channel for the escape of gases evolving in the electrolyte during operation of the battery.

In FIG. 13 there is shown a modified electrode assembly 130 whose two branches 50, 51 comprise each a central silver plate 52, a porous layer 53 of nylon mesh or the like surrounding that plate, an inner wrapper 54 of cellophane enveloping the layer 53, an outer wrapper 57, again of nylon mesh, around the cellophane envelope, and a negative electrode of the character previously described, consisting of an inner zinc layer 55 and an outer copper layer 56. The silver plates 52 advantageously have a thickness of about 0.3 to 0.4 mm. whereas the copper layer 56 may be approximately 0.02 mm. thick.

FIG. 14 shows a still further modified electrode assembly 230 whose branches 50', 51' have the same components as the branches 50, 51 of assembly 130 in FIG. 13, except that the non-conductive porous layer 57 is replaced by a copper mesh 59 bearing a spongy or porous zinc coating 58. The zinc 58 may have been applied to its support 59 by a sputtering process. It will be apparent that this support may have a variety of configurations, such as that of a wire coil or a grid; the zinc coating 58 may be initially omitted if the layer 55 is given a sufficient starting thickness to supply enough zinc for deposition on the support 59 during operation of the battery.

The invention is, of course, not limited to the specific embodiments described and illustrated but may be realized in various modifications and adaptations except as limited in the appended claims.

I claim:

1. An electrochemical cell, comprising a positive electrode, a negative electrode and electrolyte therebetween, said negative electrode comprising a layer of electrochemically active zinc material provided on one side only with a coating of copper.

2. An electrochemical cell according to claim 1 wherein said positive electrode comprises electrochemically active silver material.

3. An electrochemical cell according to claim 1 including a semipermeable separator interposed between said electrodes.

4. An electrochemical cell according to claim 1 including a layer of nylon mesh interposed between said electrodes.

5. An electrochemical cell according to claim 1 wherein said copper coating has a thickness ranging substantially from about .01 mm. to .05 mm.

6. An alkaline battery comprising an electrochemically active silver positive electrode, a negative electrode assembly and alkaline electrolyte therebetween, said positive and negative electrode being separated from each other by a semipermeable separator, said negative electrode comprising a sheet of zinc material provided only on one side with a copper coating.

7. An alkaline battery according to claim 6 including a layer of nylon mesh interposed between said semipermeable separator and said negative electrode.

8. An electrochemical battery comprising a plurality of positive electrodes, separator means wrapped around each of said positive electrodes, a plurality of zinc sheet electrodes each wrapped substantially entirely around the separator means surrounding a respective positive electrode, each of said zinc sheet electrodes being provided with only one external coating of copper, a casing holding said electrodes under pressure against said separator means and maintaining conductive contact between the external coatings thereof, and a terminal lead for all of said negative electrodes in contact with at least one of said coatings.

(References on following page)

References Cited in the file of this patent

UNITED STATES PATENTS

| | | |
|---|---|---|
| 350,297 | Desruelles | Oct. 5, 1886 |
| 1,020,568 | Morrison | Mar. 19, 1912 |
| 1,035,325 | Dodge | Aug. 13, 1912 |
| 1,393,739 | Benner et al. | Oct. 18, 1921 |
| 1,856,386 | Heise | May 3, 1932 |
| 2,060,022 | Brennan | Nov. 10, 1936 |
| 2,499,239 | Williams | Feb. 28, 1950 |
| 2,636,059 | Garine | Apr. 21, 1953 |
| 2,662,928 | Brennan | Dec. 15, 1953 |
| 2,739,179 | Barrett | Mar. 20, 1956 |
| 2,812,377 | Franquemont | Nov. 5, 1957 |
| 2,833,845 | Pucher et al. | May 6, 1958 |
| 2,851,509 | Pasquale et al. | Sept. 9, 1958 |
| 2,906,802 | Andre | Sept. 29, 1959 |

FOREIGN PATENTS

| | | |
|---|---|---|
| 4,198 of 1882 | Great Britain | May 3, 1932 |